US007160830B2

(12) United States Patent
Van Der Zon et al.

(10) Patent No.: US 7,160,830 B2
(45) Date of Patent: Jan. 9, 2007

(54) PROCESS FOR THE PREPARATION OF CATALYST MICROSPHERES

(75) Inventors: Monique Van Der Zon, Purmerland (NL); Erik Jeroen Laheij, Amstelveen (NL); Paul O'Connor, Hoevelaken (NL)

(73) Assignee: Albemarle Netherlands, B.V., Amersfoort (NL)

( * ) Notice: Subject to any disclaimer, the term of this patent is extended or adjusted under 35 U.S.C. 154(b) by 28 days.

(21) Appl. No.: 10/731,917

(22) Filed: Dec. 10, 2003

(65) Prior Publication Data

US 2004/0117949 A1 Jun. 24, 2004

Related U.S. Application Data

(60) Provisional application No. 60/445,378, filed on Feb. 6, 2003.

(30) Foreign Application Priority Data

Dec. 18, 2002 (EP) .................. 02080617

(51) Int. Cl.
*B01J 35/08* (2006.01)
(52) U.S. Cl. .................. 502/8; 502/9; 502/64; 502/67; 502/68; 502/72; 502/80; 502/355
(58) Field of Classification Search .................. 502/8, 502/9, 60, 64, 67, 68, 72, 355, 80
See application file for complete search history.

(56) References Cited

U.S. PATENT DOCUMENTS

| 2,466,052 | A | * | 4/1949 | Shabaker et al. ............. 502/81 |
| 2,686,161 | A | | 8/1954 | Stewart ...................... 252/448 |
| 3,515,684 | A | | 6/1970 | McEnvoy .................. 252/455 |
| 4,902,666 | A | * | 2/1990 | Rainis ........................ 502/439 |
| 4,946,654 | A | * | 8/1990 | Uhlemann et al. ........... 422/140 |
| 5,001,096 | A | * | 3/1991 | Chu et al. .................... 502/65 |
| 5,100,853 | A | | 3/1992 | Thome et al. ................ 502/64 |
| 5,114,895 | A | * | 5/1992 | Holmgren et al. ............ 502/84 |
| 5,254,516 | A | * | 10/1993 | Gupta et al. ................. 502/84 |
| 5,286,370 | A | * | 2/1994 | Chu et al. .............. 208/120.25 |
| 5,413,978 | A | | 5/1995 | Kramer ....................... 502/80 |
| 5,521,133 | A | * | 5/1996 | Koermer et al. ............... 502/9 |
| 6,569,463 | B1 | * | 5/2003 | Patel et al. ................. 424/497 |

FOREIGN PATENT DOCUMENTS

| DE | 239530 | 10/1986 |
| EP | 0670179 | 9/1995 |
| RU | 2174951 | 10/2001 |

OTHER PUBLICATIONS

Derwent Abstract of German Patent No. 239530, dated Oct. 1, 1986.
Derwent Abstract of Japanese Patent No. 57045344 (1981).
C.Y. Yu et al., Drying Technology 17, "Study of Fluidized-Bed Spray Granulation", pp. 1893-1904 (1999).
H, Kage et al., Korean J. Chem. Eng. 16, "Powder Coating Efficiency of Small Particles and Their Agglomeration in Circulating Fluidized Bed", pp. 630-634 (1999).
T. Zhou and H. Li, Powder Technology 111, "Force Balance Modelling for Agglomerating Fluidization of Cohesive Particles", pp. 60-65 (2000).
S. Watano et al., Chem. Pharm. Bull. 44, "Modeling of Agitation Fluidized Bed Granulation by Random Coalescence Model", pp. 1357-1360 (1996).
H. Tsujimoto et al., Powder Technology 113, "Monitoring Particle Fluidization in Fluidized Bed Granulator With an Acoustic Emission Sensor", pp. 88-96 (2000).
European Search Report of Priority Application No. EP 02080617, dated Mar. 7, 2003.

* cited by examiner

*Primary Examiner*—David Sample
(74) *Attorney, Agent, or Firm*—Frank C. Eymard

(57) ABSTRACT

The present invention relates to a process for the preparation of catalyst particles with a particle diameter in the range 20–2000 microns involving the steps of agitating at least two dry catalyst ingredients, spraying a liquid binding agent on the catalyst ingredients while continuing the agitation, and isolating formed catalyst particles with the desired particle diameter and comprising the catalyst ingredients. In contrast to the conventional way of preparing such particles, spray-drying, the present process allows the formation of small particles from slurries with a high solids content. Hence, smaller amounts of liquid have to be evaporated, which makes the process energy efficient.

11 Claims, No Drawings

PROCESS FOR THE PREPARATION OF CATALYST MICROSPHERES

CROSS REFERENCE TO RELATED APPLICATIONS

Priority of this application is based on EP Patent Application No. 02080617.0, filed Dec. 18, 2002, and U.S. Patent Application No. 60/445,378, filed on Feb. 6, 2003.

BACKGROUND OF THE INVENTION

1. Field of the Invention

The present invention relates to a process for the preparation of catalyst compositions with a particle diameter in the range 20–2000 microns.

2. Prior Art

For several catalytic applications, such as fluidized bed processes, small catalyst particles are required. Such particles are generally produced by spray-drying a mixture of the catalyst ingredients. For instance, fluid catalytic cracking (FCC) catalysts are generally prepared by spray-drying an aqueous slurry of zeolite, clay, and silica and/or alumina.

Spray-drying involves pumping a slurry containing the catalyst ingredients through a nozzle (a high-pressure nozzle or a rotating wheel with nozzle) into a chamber heated with hot air. During this process, high shear is placed on the slurry, thereby creating small droplets that quickly dry in the heated chamber.

Depending on the type of nozzle used, the particle size distribution of the resulting catalyst particles depends on either the nozzle pressure or the rotating speed of the wheel, but generally lies in the range of 30–90 microns.

Unfortunately, only slurries with a low solids content (i.e. below about 45 wt % solids) and, consequently, a high liquid content can be spray-dried. Slurries with a higher solids content either are too viscous to be pumped through the nozzle or will not give suitable droplets upon spraying.

Due to this low solids limitation, large volumes of liquid are required, which have to be evaporated during the drying step. This is energy inefficient.

This problem is solved by the process according to the present invention.

SUMMARY OF THE INVENTION

In one embodiment, the present invention comprises a process for the preparation of catalyst particles with a particle diameter in the range 20–2000 microns, which process comprises the steps of:
a) agitating at least two dry catalyst ingredients,
b) spraying a liquid binding agent on the catalyst ingredients while continuing the agitation,
c) isolating formed catalyst particles with the desired particle diameter and comprising the catalyst ingredients, and
d) optionally calcining the isolated catalyst particles.

Other embodiments of the invention relate to process details and ingredient compositions.

DETAILED DESCRIPTION OF THE INVENTION

Within this specification, the term catalyst compositions also encompasses catalyst additives and adsorbents.

This process requires less liquid than spray-drying. Hence, less liquid has to be evaporated in the drying step, making this process more energy efficient than spray-drying.

The process according to the invention requires at least two individual catalyst ingredients to form a catalyst particle. It is not a process that involves only surface coating of existing catalyst particles as in U.S. Pat. No. 5,286,370 and U.S. Pat. No. 5,001,096.

Suitable agitation techniques involve fluidization and high-shear mixing.

Fluidization is performed by fluidizing the catalyst ingredients in a stream of gas, generally air. A nozzle is present above the so formed fluidized bed. Through this nozzle, the liquid binding agent is sprayed on the catalyst ingredients. A suitable apparatus for performing this process is a fluidized bed granulator.

The gas velocity influences the size of the catalyst particles obtained. This gas velocity preferably ranges from 1–10 times the minimum fluidization velocity and most preferably from 1–5 times the minimum fluidization velocity, with the minimum fluidization velocity being defined as the minimum gas velocity required for holding up the catalyst ingredients. It will be clear that this minimum velocity depends on the particle size of the catalyst ingredients: the larger the particles, the higher the required minimum gas velocity. Catalyst ingredients for the preparation of FCC catalyst particles generally have a particle size up to about 10 microns.

The temperature of the gas preferably ranges from 20° to 700° C., more preferably from 50° to 200° C., and most preferably from 80° to 120° C.

High-shear mixing is performed in a high-shear mixer. A nozzle is present in the mixer, above the catalyst ingredients. Through this nozzle, the liquid binding agent is sprayed on the catalyst ingredients.

The preferred shear rate ranges from 250 to 5000 $s^{-1}$, more preferably from 250 to 2500 $s^{-1}$, and most preferably from 500 to 1000 $s^{-1}$.

The temperature during high shear mixing preferably is below 100° C., more preferably below 50° C., and most preferably ambient.

Catalyst ingredients which can be used in the process according to the invention include solid acids, alumina, iron (hydr)oxide, (meta)kaolin, bentonite, (calcined) anionic clays, saponite, sepiolite, smectite, montmorillonite, and mixtures thereof.

Suitable solid acids include zeolites such as zeolite beta, MCM-22, MCM-36, mordenite, faujasite zeolites such as X-zeolites and Y-zeolites (including H-Y-zeolites, RE-Y zeolites, and USY-zeolites), pentasil-type zeolites such as ZSM-5, non-zeolitic solid acids such as silica-alumina, sulphated oxides such as sulphated oxides of zirconium, titanium, or tin, sulphated mixed oxides of zirconium, molybdenum, tungsten, etc., and chlorinated aluminum oxides.

Suitable aluminas include boehmite, pseudoboehmite, transition aluminas such as alpha-, delta-, gamma-, eta-, theta-, and chi-alumina, aluminum trihydrate such as gibbsite or bauxite ore concentrate (BOC), and flash-calcined aluminum trihydrate.

Examples of suitable anionic clays (also called hydrotalcite-like materials or layered double hydroxides) are Mg—Al anionic clays, Fe—Al anionic clays, Zn—Al anionic clays, Fe—Fe anionic clays, etc.

The catalyst ingredients used have to be dry before starting the process according to the invention. The term "dry" in this context means that not more than 90% of the pore volume of these ingredients is filled with water.

Most of the aluminas used for FCC applications are made via precipitation processes. These processes usually involve the sequential steps of precipitation, crystallization, and dewatering. A suitable dewatering technique to obtain alumina sufficiently dry to be used in the process according to the invention uses a high-pressure filter.

Zeolites are usually prepared via crystallization, washing/dewatering, ion-exchange with $NH_4$ and rare earth metals (RE), drying, calcination, and milling.

Suitable liquid binding agents include water, acidic aqueous solutions, or aqueous silicon and/or aluminum-containing solutions or suspensions. The term "liquid binding agent" refers to liquids, solutions, or suspensions that assist in binding of the catalyst ingredients to form the catalyst particles. The liquid binding agent can initiate this binding either during step b) or later, for instance during an additional calcination step. Whether or not binding takes place during step b) depends on the liquid binding agent and the catalyst ingredients used.

The desired liquid binding agent depends on the desired binder. For example:

If anionic clay is the desired binder, water can be used as the liquid binding agent and a calcined anionic clay as one of the catalyst ingredients. Said water will rehydrate the calcined anionic clay to form a binder anionic clay.

If alumina is the desired binder, acidified water can be used as liquid binding agent and a peptizable alumina such as pseudoboehmite as one of the catalyst ingredients. Alternatively, aluminum chlorohydrol (ACH) or aluminum nitrohydrol (ANH)-containing suspensions can be used as liquid binding agent, with formation of alumina binder, irrespective of the types of catalyst ingredients used.

Consequently, if one of the catalyst ingredients is an alumina and ACH or ANH is used as liquid binding agent, the resulting catalyst will comprise two types of alumina. Another option to obtain a catalyst particle with an alumina binder is to use water as the liquid binding agent and flash-calcined aluminum trihydrate as one of the catalyst ingredients. Although the latter combination does not result in binding of the particles during step b), binding does take place during an additional calcination step (step d).

If silica is the desired binder, a solution or suspension containing a silicon compound can be used as liquid binding agent, irrespective of the types of catalyst ingredients used. Examples of suitable silicon compounds are silica sol, sodium (meta) silicate, and precipitated silica.

More than one liquid binding agent can be used, which can be sprayed on the catalyst ingredients sequentially. For instance, a silicon-containing solution or sol, or an aluminum chlorohydrol or nitrohydrol-containing sol can be used as a first liquid binding agent, while acidified water can be used as a second liquid binding agent.

Depending on the extent of dryness of the catalyst ingredients, it may be preferred to spray some water on the catalyst ingredients before spraying the liquid binding agent. The required amount of water is such that about 90% of the pores of the catalyst ingredients can be filled with water.

The liquid binding agent is preferably sprayed on the catalyst ingredients at a rate of 1–1.5 times the required amount divided by the residence time. This residence time generally ranges from about 1 to 30 minutes. The droplet size preferably is between 1 and 20 micrometers.

Agitation is continued until the right particle size is obtained. In the case of fluidized bed granulation, the gas velocity is selected in such a way that it can only hold up particles smaller than the desired size. Hence, once the particles have the desired size, they fall down.

The particles obtained by the process according to the invention range in size from about 20 to about 2000 microns, preferably 20–600 microns, more preferably 20–200 microns, and most preferably 30–100 microns. For fluid catalytic cracking (FCC) applications a particle size between 30 and 100 microns is preferred.

If desired, the resulting particles are dried and/or calcined. If the applied liquid binding agent does not result in binding during agitation step b), a calcination step d) may be required to initiate this binding.

Drying involves heating of the formed particles at a temperature preferably in the range 100–200° C. Calcination is preferably conducted at 300°–1200° C., more preferably 300°–800° C., and most preferably 300°–600° C. for 15 minutes to 24 hours, preferably 1–12 hours, and most preferably 2–6 hours.

The particles obtained by the process according to the invention can be used for various purposes, e.g. as a catalyst, adsorbent, etc. Suitable catalytic applications include Gas to Liquid processes (e.g. Fischer-Tropsch), E-bed and H-oil processes, reforming, isomerization, alkylation, and auto exhaust catalysis.

EXAMPLES

Example 1

This Example describes the preparation of FCC catalyst particles with the following composition (on dry base): 15 wt % alumina, 20 wt % USY, 4 wt % silica, 61 wt % kaolin.

A fluidized bed granulator was filled with about 200 g of a mixture of dry pseudoboehmite, dry kaolin, and dry zeolite. The mixture was fluidized and afterwards 35 g of silicasol were sprayed on top of the fluidized bed at a rate of 4.8 g/min. Simultaneously, the inlet temperature of the gas was set to 70° C. Next, 10% nitric acid solution was sprayed on top of the fluidized bed through the same nozzle at a rate of 4.8 g/min. After addition of 100 g of the nitric acid solution, liquid addition was stopped and the gas inlet temperature was set to 135° C. to dry the material.

The resulting FCC particles had a mean diameter (d50) of 76 microns. SEM analysis showed that the particles had a uniform distribution of ingredients.

Example 2

This Example describes the preparation of FCC catalyst particles with the following composition (on dry base): 15 wt % pseudoboehmite, 20 wt % USY, 10 wt % alumina originating from aluminum chlorohydrol (ACH), 55 wt % kaolin.

A fluidized bed granulator was filled with about 200 g of a mixture of dry pseudoboehmite, dry kaolin, and dry zeolite. The mixture was fluidized and afterwards 90 g of an aluminum chlorohydol suspension were sprayed on top of the fluidized bed at a rate of 4.8 g/min. Simultaneously, the inlet temperature of the gas was set to 70° C. Next, a 10% nitric acid solution was sprayed on top of the fluidized bed through the same nozzle at a rate of 4.8 g/min. After addition of 100 g of the nitric acid solution, the liquid addition was stopped and the gas inlet temperature was set to 135° C. to dry the material.

The resulting FCC particles had a mean diameter (d50) of 78 microns. SEM analysis showed that the particles had a uniform distribution of ingredients.

Example 3

This Example describes the preparation of FCC catalyst particles with the following composition (on dry base): 25 wt % pseudoboehmite, 25 wt % USY, 35 wt % kaolin, and 15 wt % Mg—Al anionic clay.

A Mg—Al anionic clay was first calcined and then rehydrated in aqueous suspension at hydrothermal conditions, i.e. 130° C. and autogeneous pressure.

A fluidized bed granulator was filled with about 200 g of a mixture of dry pseudoboehmite, kaolin, the anionic clay, and zeolite. The mixture was fluidized and afterwards 10% nitric acid solution was sprayed on top of the fluidized bed through the same nozzle at a rate of 4.8 g/min. Simultaneously, the inlet temperature of the gas was set to 70° C. After addition of 100 g of the nitric acid solution, liquid addition was stopped and the gas inlet temperature was set to 135° C. to dry the material.

The resulting FCC particles have a mean diameter (d50) of 75 microns. SEM analysis showed that the particles had a uniform distribution of ingredients.

The invention claimed is:

1. A process for the preparation of catalyst particles comprising the steps of:
    agitating at least two dry catalyst ingredients within an agitation container, wherein the dry catalyst ingredients have less than 90% of their pore volume filled with water,
    spraying a liquid binding agent on the catalyst ingredients while continuing the agitation, drying the catalyst ingredients at a temperature in the range of 100 to 200° C. within the agitation container, allowing the catalyst ingredients to agglomerate to form catalyst particles within the agitation container, wherein the catalyst particles have a particle diameter in the range of 20 to less than 1000 microns, and
    optionally calcining the catalyst particles.

2. The process of claim 1 wherein agitation is performed by high-shear mixing.

3. The process of claim 1 wherein agitation is performed by fluidization.

4. The process of claim 1 wherein at least one of the catalyst ingredients is alumina, clay, or zeolite.

5. The process of claim 1 wherein the liquid binding agent is selected from the group consisting of water, an aqueous acidic solution, a silicon-containing solution or suspension, a suspension comprising aluminum chlorohydrol and/or aluminum nitrohydrol, and mixtures thereof.

6. The process of claim 2 wherein the shear rate applied on the catalyst ingredients during high-shear mixing ranges from 250 to 1000 $s^{-1}$.

7. The process of claim 3, wherein the fluidization gas velocity corresponds to the minimum fluidization velocity for particles having a particle diameter in the range of 20 to less than 2000 microns.

8. The process of claim 7, wherein the fluidization gas velocity corresponds to the minimum fluidization velocity for particles having a particle diameter in the range of 30 to less than 100 microns.

9. The process of claim 8, wherein at least one of the catalyst ingredients is alumina, clay, or zeolite.

10. The process of claim 9, wherein the liquid binding agent binds the catalyst ingredients as they are dried.

11. The process of claim 10, wherein the liquid binding agent is a suspension comprising aluminum chlorohydrol, aluminum nitrohydrol, or mixtures thereof.

* * * * *